US008200198B2

(12) United States Patent
Lee et al.

(10) Patent No.: US 8,200,198 B2
(45) Date of Patent: Jun. 12, 2012

(54) POWER OUTLET APPARATUS WITH MESSAGE LEAVING CAPABILITY AND MESSAGE LEAVING METHOD THEREOF

(75) Inventors: Yu-Lung Lee, Nanjhuang Township, Miaoli County (TW); Ming-Chou Kuo, Taipei (TW)

(73) Assignee: Powertech Industrial Co., Ltd., Chung Ho (TW)

( * ) Notice: Subject to any disclaimer, the term of this patent is extended or adjusted under 35 U.S.C. 154(b) by 376 days.

(21) Appl. No.: 12/506,470

(22) Filed: Jul. 21, 2009

(65) Prior Publication Data

US 2010/0255779 A1    Oct. 7, 2010

(30) Foreign Application Priority Data

Apr. 6, 2009  (TW) .............................. 98111358 A

(51) Int. Cl.
*H04L 12/58* (2006.01)
*H04M 1/725* (2006.01)
(52) U.S. Cl. .................................. 455/412.1; 455/41.2
(58) Field of Classification Search .................... 307/38, 307/40, 116, 139, 72; 340/815.72, 310.18; 455/412.1, 412.2, 413, 41.2, 41.3
See application file for complete search history.

(56) References Cited

U.S. PATENT DOCUMENTS

| | | | | |
|---|---|---|---|---|
| 2003/0127913 | A1* | 7/2003 | Roberts et al. | 307/89 |
| 2008/0309164 | A1* | 12/2008 | Lim | 307/39 |
| 2010/0031295 | A1* | 2/2010 | Krzyzanowski et al. | 725/52 |
| 2010/0044195 | A1* | 2/2010 | Chiang et al. | 200/175 |
| 2010/0045611 | A1* | 2/2010 | Nelson et al. | 345/173 |
| 2010/0195541 | A1* | 8/2010 | Ray | 370/259 |

* cited by examiner

*Primary Examiner* — Ping Hsieh
(74) *Attorney, Agent, or Firm* — C. G. Mersereau; Nikolai & Mersereau, P.A.

(57) ABSTRACT

Provided are a power outlet apparatus with message leaving capability and the message leaving method thereof, in which the apparatus includes several units coupling with a computation processing module, such as a communication module, a storage unit, an indication unit, a display unit, and a sound generation unit. A protection module is further included for providing power to all of the modules and units mentioned above. And moreover, the apparatus includes at least one power socket coupling with the power protection and controlling module, wherein the power sockets are for connecting electrical devices requiring power supply. By introducing the electrical message board into the power outlet apparatus, the occupied spaces of the message board is reduced. Furthermore, the power provision of electrical message board is getting more convenient by directly acquiring the electrical power from the power outlet apparatus.

15 Claims, 6 Drawing Sheets

POWER OUTLET APPARATUS WITH MESSAGE LEAVING CAPABILITY AND MESSAGE LEAVING METHOD THEREOF

BACKGROUND OF THE INVENTION

1. Field of the Invention

The present invention related to a power outlet apparatus, especially to a power outlet apparatus with message leaving capability and the message leaving method thereof.

2. Description of Related Art

Sticking on a board by a magnet, nailing on a cork board by a thumbtack, sticking on somewhere, and simply leaving a paper note are the conventional messaging ways. Somehow the ways are inconvenient. For example, the conventional ways may occupy spaces, waste paper, fail to show video messages, lose frequently, require a specific place, or misunderstand because of poor writing.

However an electrical message board was developing, but it requires batteries in need of frequently changing or charging. Thus the electrical message board is still inconvenient and inefficient.

Additionally, the conventional power outlets, such as an electrical extension line or an AC power socket, have been used generally in families or offices for power provision. The conventional power outlets lack extra functionality besides the traditional power protection mechanics.

SUMMARY OF THE INVENTION

A power outlet apparatus with message leaving capability is disclosed. By the present invention, the occupied spaces of message board can be reduced, and the power provision problem of electrical message board can be improved. Further, the users can use a portable device (such as a mobile phone, a notebook computer, or a PDA) to leave message, and make leaving message more convenient.

For achieving the purposes mentioned above, a power outlet apparatus with message leaving capability is provided according to the present invention. That is to install a message leaving module in the power outlet apparatus. Thus the apparatus includes a computation processing module, a communication module, a storage unit, a protection module, and at least one power socket.

In which, the computation processing module is a central component for processing data and signals. The communication module may be a wireless communication module, such as Bluetooth communication module, which is coupled with the computation processing module. The communication module is for receiving signals and messages from users. Further, the storage unit coupling with the computation processing module is for storing the messages from users. The storage unit can be a non-volatile memory or a memory card accessed through a card reader which is for reading and writing data in the memory card.

Further, the protection module is coupled with the computation processing module, the communication module, and the storage unit, in which the protection module is for providing requisite power to the apparatus. In which, the protection module includes a surge protection module, an electromagnetic interference protection module, and a power converting module.

The communication module is used to receive a message from a first portable device (such as a mobile phone, a notebook computer, or a PDA) made by a first user. The message is then stored in the storage unit. When a second user wants to read the message, the communication module then sends the message wirelessly to a second portable device of the second user. Specially, the requisite power supply of all the modules mentioned above is directly provided by the power outlet apparatus, rather than provided by a battery.

Additionally, the power outlet apparatus with message leaving capability may further have an indication unit, a display unit, and a sound generation unit. In which the indication unit is for indicating that there is at least one message stored in the storage unit. And the display unit and the sound generation unit are for showing the message with multimedia contents.

Next, a message leaving method is disclosed according to the present invention. The method is applicable to a power outlet apparatus with a message leaving module, in which the message leaving module has a computation processing module, a communication module, and a storage unit. The method firstly receives a message through the communication module, and then stores the message in the storage unit. After received a command signal from a user the message leaving module, the method then shows the message which stored in the storage unit according to the command signal.

Specially, the step of receiving the command signal uses the message leaving module to detect the user pressing a display button of the display unit. The display unit then displays the contents of the message. Alternatively, the step of receiving the command signal uses the message leaving module to receive the command signal sent from a portable device of the user, and the communication module then sends the message to the portable device according to the command signal.

The spaces occupied by the message board can be reduced by setting the message leaving module with the power outlet apparatus. And the problem of power provision can be solved by directly providing power to the message leaving module by the power outlet apparatus. Furthermore, by means of the communication module such as a Bluetooth communication module, the user may leave messages simply by a portable device (such as a mobile phone). Therefore, the convenience and practical value of leaving messages are provided.

For further understanding of the invention, reference is made to the following detailed description illustrating the embodiments and examples of the invention. The description is only for illustrating the invention, not for limiting the scope of the claim.

BRIEF DESCRIPTION OF THE DRAWINGS

The drawings included herein provide further understanding of the invention. A brief introduction of the drawings is as follows.

DETAILED DESCRIPTION OF THE PREFERRED EMBODIMENTS

Figure 1:
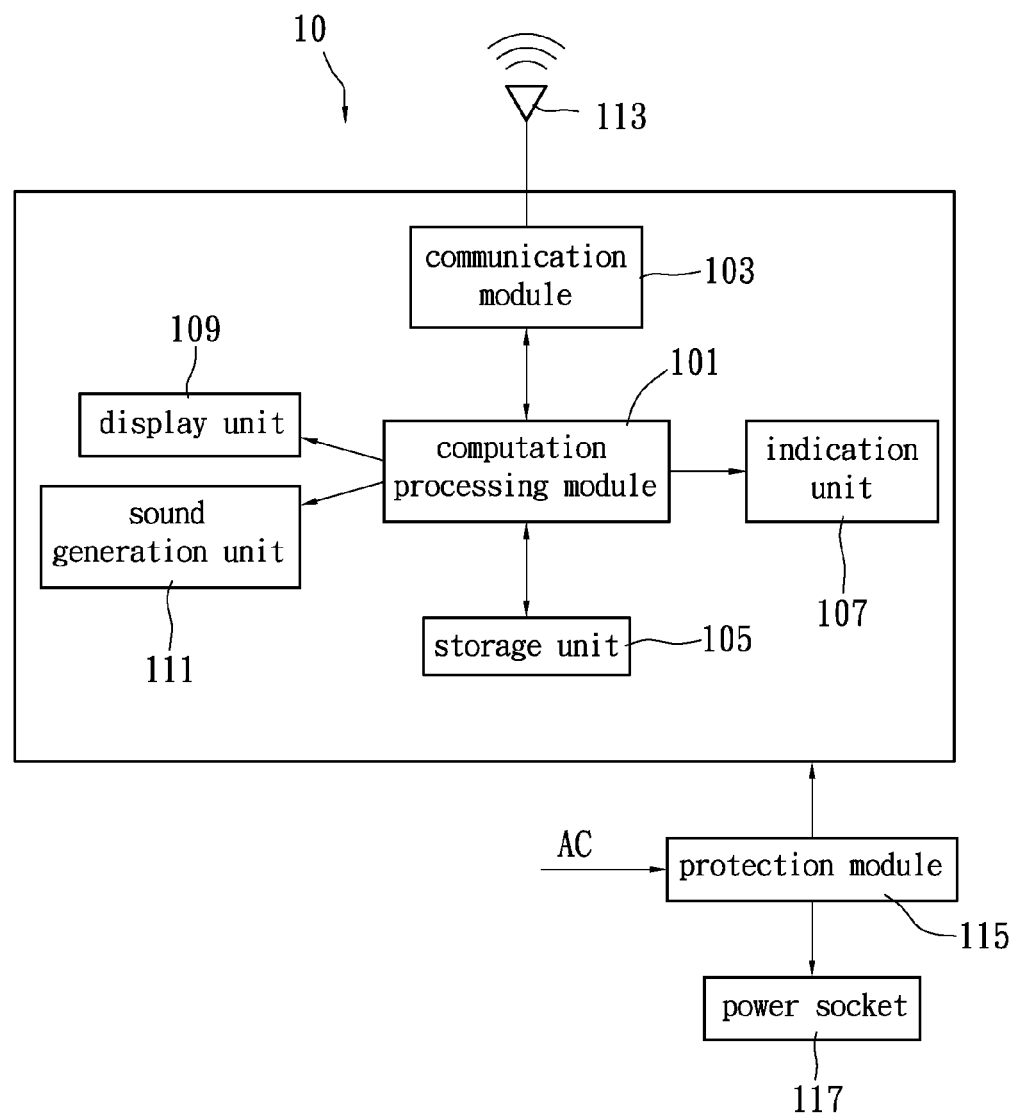
FIG. 1 is a block diagram of an embodiment of power outlet apparatus according to the present invention.

Please refer to FIG. 1, which is a block diagram of an embodiment of a power outlet apparatus 10 with message leaving capability. A message leaving module is provided along with the power outlet apparatus 10, thus the power outlet apparatus 10 has a computation processing module 101, a communication module 103, a storage unit 105, an indication unit 107, a display unit 109, a sound generation unit 111, a protection module 115, and at least a power socket 117.

Wherein the computation processing module 101 is a central component for processing data and signals. The communication module 103 is coupled with the computation processing module 101, in which the communication module 103 can be a Bluetooth communication module, etc, and is for sending and receiving signal and messages. The communication module 103 further includes an antenna 113.

Further, the storage unit 105 is coupled with the computation processing module 101, in which the storage unit 105 may be a non-volatile memory or a memory card accessed through a card reader, and is for storing the messages. The indication unit 107 can be a LED, which is coupled with the computation processing module 101. In which the indication unit 107 is for informing users that there is at least one message stored in the storage unit 105, wherein the way of informing users can be light emitting or twinkling.

Additionally, the display unit 109 may be a LCD screen, in which the display unit 109 is coupled with the computation processing module 101, and has a display button for user to check the contents of the message on the display unit 109. And the sound generation unit 111 is coupled with the computation processing module 101, in which the sound generation unit 111 is for generating sounds.

Moreover, the protection module 115 is for providing the requisite power to all of the modules and devices of the power outlet apparatus 10. In which the protection module 115 includes a power converting module, a surge protection module, and an electromagnetic interference protection module. The power converting module for regulating the voltage level of an AC power input, and converting the AC power input to DC power. The surge protection module and the electromagnetic interference protection module is for providing safety mechanics to the power outlet apparatus 10. Furthermore, the power socket 117 is coupled with the protection module 115, for providing requisite power to an electrical device which plugs in the power socket 117.

In which, the power outlet apparatus 10 has several types, such as strip type, wall-tap type, block type, rackmount type, or desktop type, etc, and the using of those types are according to the requirement of the user and places where the user use the power outlet apparatus 10.

Figure 2:
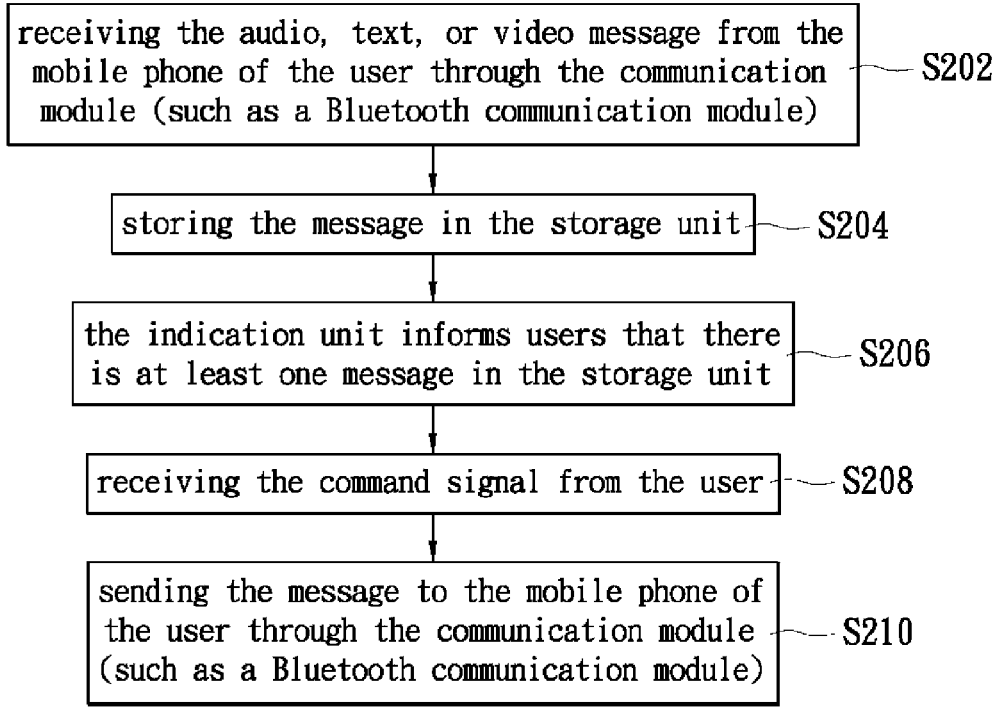
FIG. 2 is a flow chart of an embodiment of message leaving method according to the present invention.

Please refer to FIG. 2, which is a flow chart of an embodiment of message leaving method. Reference is made to FIG. 2 in view of FIG. 1. The message leaving module is provided to the power outlet apparatus 10, in which the method includes receiving a message with text, audio, or video contents from a portable device (such as a mobile phone, a PDA, or a notebook computer) of a user through the communication module 103 (such as a Bluetooth communication module) (S202).

The message is then stored in the storage unit 105 (S204), and the indication unit 107 informs users that there exists at least one message in the storage unit 105 by emitting or twinkling lights (S206). And after the message leaving module receives a command signal which indicates that the user wants to read the message (S208), the communication module 103 (such as a Bluetooth communication module) then sends the message to the portable device (such as a mobile phone) of the user (S210).

Figure 3:
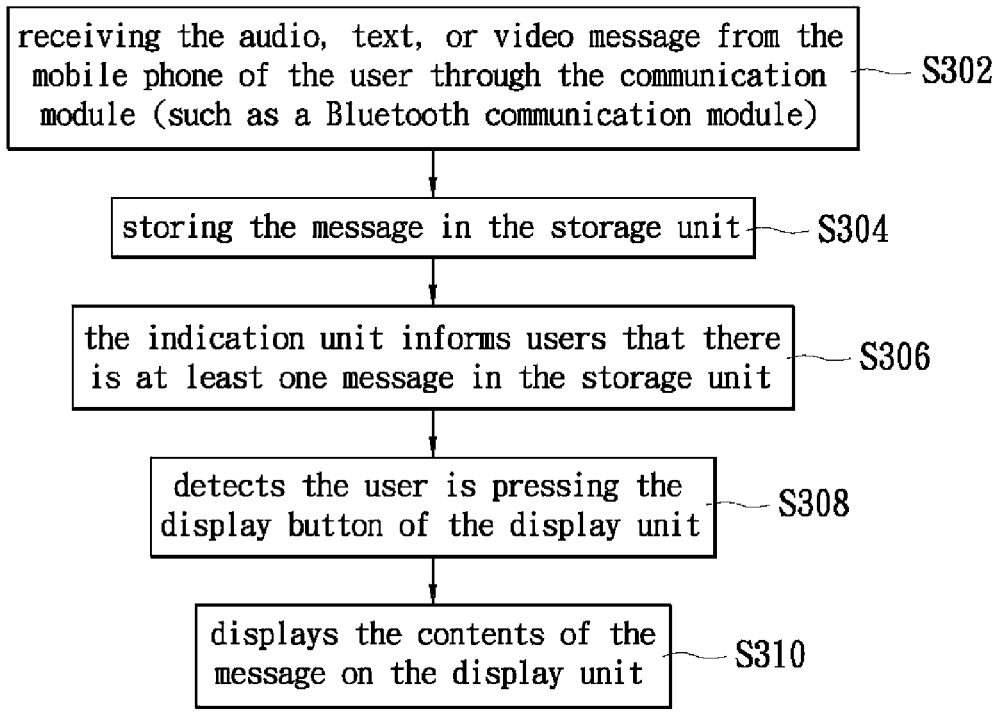
FIG. 3 is a flow chart of another embodiment of message leaving method according to the present invention.

Please refer to FIG. 3, which is a flow chart of another embodiment of message leaving method. Corresponding FIG. 2 with FIG. 1 for explanation. Similarly, the message leaving module is provided to the power outlet apparatus 10, in which the method includes receiving a message with text, audio, or video contents from a portable device of a user through the communication module 103 (S302).

The message is then stored in the storage unit 105 (S304), and the indication unit 107 informs users that there exists at least one message in the storage unit 105 by emitting or twinkling lights (S306). Further, after the message leaving module detects that the user presses a display button of the display unit 109 (S308), the display unit 109 then displays the contents of the message for reading by the user (S310).

Figure 4A:
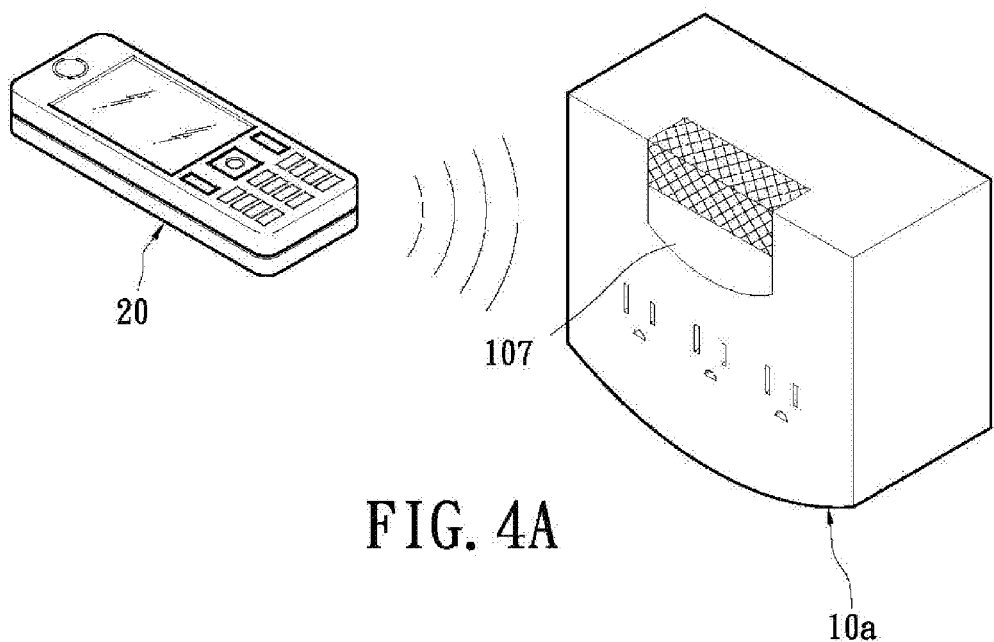
FIG. 4A, 4B are schematic diagrams of an embodiment of using the power outlet apparatus according to the present invention.

Please refer to FIG. 4A, which is a schematic diagram of an embodiment of using the power outlet apparatus with message leaving capability. The type of the power outlet apparatus 10a shown in FIG. 4A is wall-tap type. The power outlet apparatus 10a receives a message from a first portable device 20 (it's a mobile phone in this embodiment) of a first user wirelessly (such as Bluetooth technology), and stores the message in the storage unit 105.

Figure 4B:
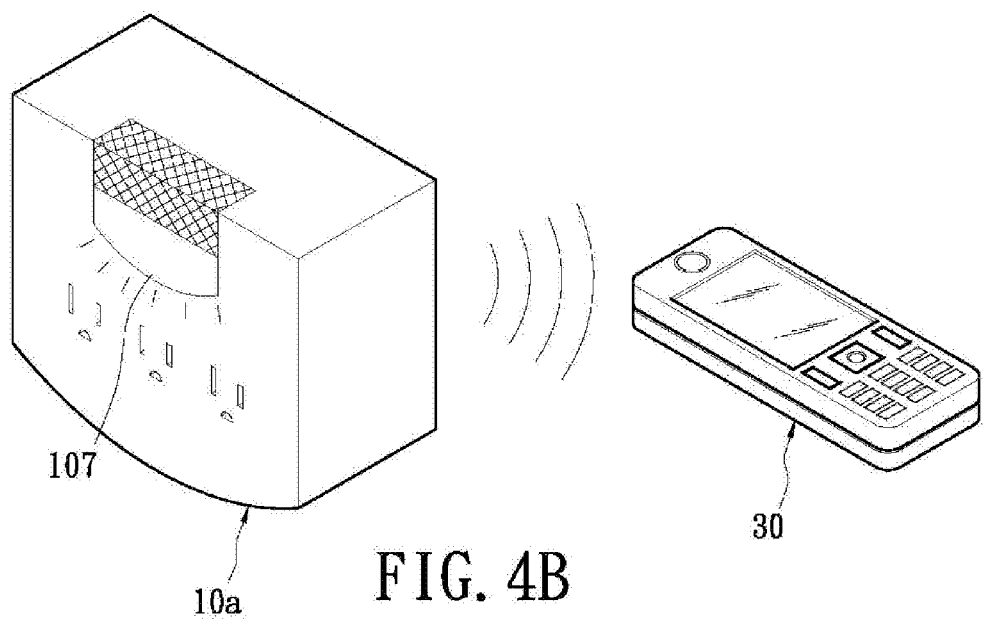

Next, please refer to FIG. 4B, when there is a message, the indication unit 107 then starts to twinkle, for informing users. If a second user wants to read the message stored in the storage unit 105, he can use a second portable device 30 to receive the message sent by the power outlet apparatus 10a for further reading.

Figure 5A:
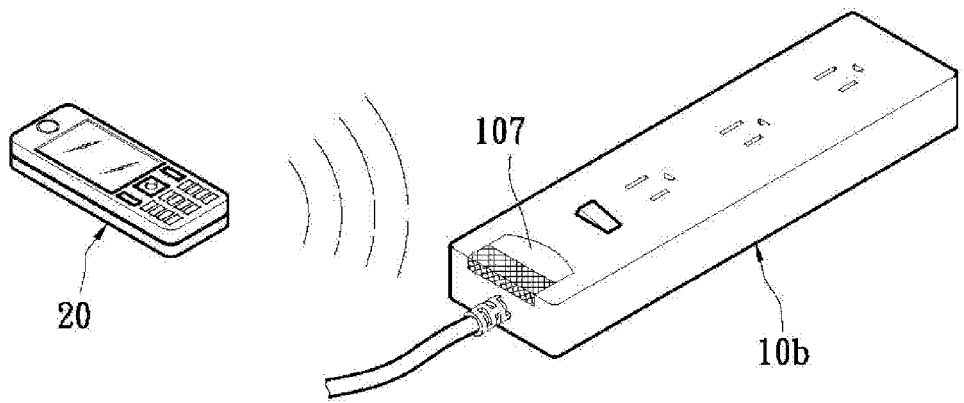
FIG. 5A, 5B are schematic diagrams of another embodiment of using the power outlet apparatus according to the present invention.

Please refer to FIG. 5A, which is a schematic diagram of another embodiment of using the power outlet apparatus with message leaving capability. The type of the power outlet apparatus 10b shown in FIG. 5A is strip type. Similarly, the power outlet apparatus 10b receives a message from a first portable device 20 of a first user wirelessly, and stores the message in the storage unit 105.

Figure 5B:
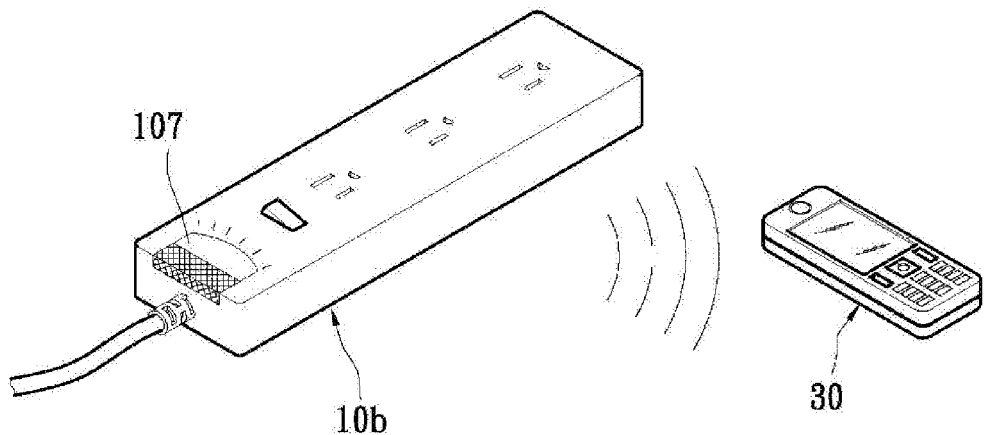

Next, please refer to FIG. 5B, when there is a message, the indication unit 107 then starts to twinkle, for informing users. If a second user wants to read the message stored in the storage unit 105, he can use a second portable device 30 to receive the message sent by the power outlet apparatus 10b for further reading.

Figure 6A:
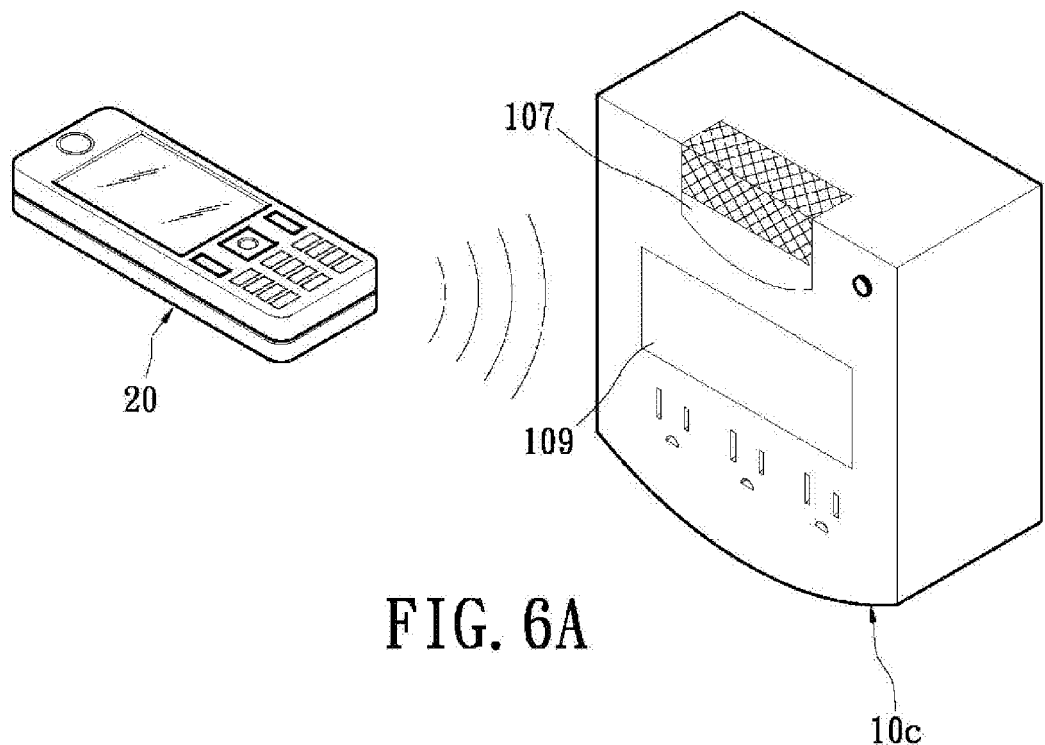
FIG. 6A, 6B are schematic diagrams of still another :embodiment of using the power outlet apparatus according to the present invention.

Please refer to FIG. 6A, which is a schematic diagram of another embodiment of using the power outlet apparatus with message leaving capability. The type of the power outlet apparatus 10c shown in FIG. 6A is wall-tap type. The power outlet apparatus 10c receives a message from a first portable device 20 of a first user wirelessly, and stores the message in the storage unit 105.

Figure 6B:
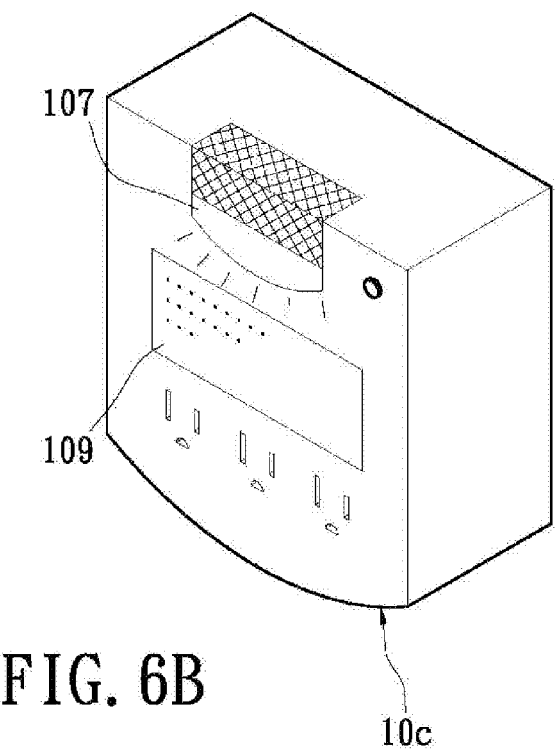

Next, please refer to FIG. 6B, when there is a message, the indication unit 107 then starts to twinkle, for informing users. If a second user wants to read the message stored in the storage unit 105, he can press a display button of the display unit 109. Then the power outlet apparatus 10c shows the contents of the message by the display unit 109 and the sound generation unit 111 according to the message contents (such as text, audio, or video) for further reading.

Figure 7A:
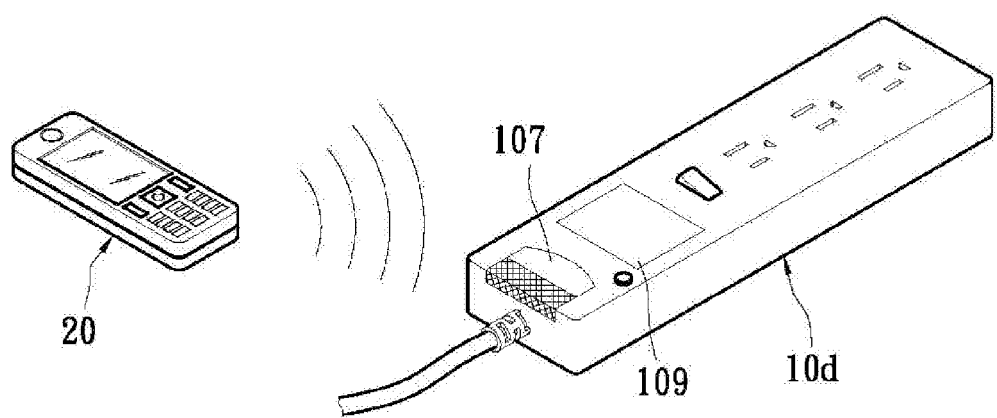
FIG. 7A, 7B are schematic diagrams of still another embodiment of using the power outlet apparatus according to the present invention.

Please refer to FIG. 7A, which is a schematic diagram of another embodiment of using the power outlet apparatus with message leaving capability. The type of the power outlet apparatus 10d shown in FIG. 7A is strip type. Similarly, the power outlet apparatus 10d receives a message from a first portable device 20 of a first user wirelessly, and stores the message in the storage unit 105.

Figure 7B:
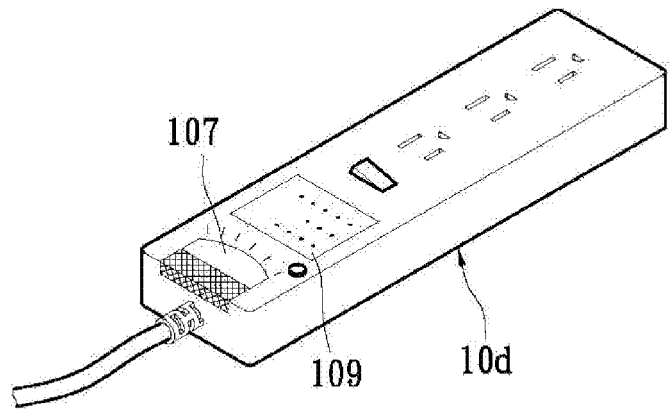

Next, please refer to FIG. 7B, when there is a message, the indication unit 107 then starts to twinkle, for informing users. If a second user wants to read the message stored in the storage unit 105, he can press a display button of the display unit 109. Then the power outlet apparatus 10d shows the contents of the message by the display unit 109 and the sound generation unit 111 according to the message contents (such as text, audio, or video) for further reading.

Additionally, the power outlet apparatus may use the techniques of wireless communication (such as Bluetooth) to detect nearby users, for controlling whether or not to provide power to the electrical devices or the apparatus itself. According to the effective distance of the Bluetooth technique, if the portable device of the user approaches to the power outlet apparatus, the power outlet apparatus is then activated for providing electrical power. In the contrary, when the portable device of the user is away from the power outlet apparatus and is out of the effective communication distance of the Bluetooth, the power outlet apparatus is then deactivate and stops providing electrical power (but maintains minimum stand by power to the message leaving module).

Moreover, besides the transmission of the messages, the power outlet apparatus can send power consumption value, voltage status, or current status to the portable device (such as mobile phone, PDA, or notebook computer). And the portable device can further control the power outlet apparatus for work time setting or power consumption managing, etc.

By applying a message leaving module with the power outlet apparatus, the occupying spaces of the message board can be reduced, and the inconvenience of changing battery can be eliminated by acquiring power directly from the power outlet apparatus. Along with the wireless communication techniques (for example, Bluetooth), the users can use their portable devices to leave message easily to the power outlet apparatus with message leaving capability. Additionally, if the users want to check the contents of the messages, they don't need to go to specific place to read the message as in conventional cases. They just need to load the message into their portable devices to read according to the wireless communication techniques. This can further eliminate the problem of wasting paper, and increases the convenience and practical value of message leaving.

The description above only illustrates specific embodiments and examples of the invention. The invention should cover various modifications and variations made to the structures and operations described herein, and they still fall within the scope of the invention as defined in the following appended claims.

What is claimed is:

1. A power outlet apparatus with message leaving capability, which comprises:
    a computation processing module being a central component for processing data and signals;
    a communication module coupled with the computation processing module, for receiving the signals and at least a message from a portable device;
    a storage unit coupled with the computation processing module, for storing the message from the portable device;
    a protection module coupled with the computation processing module, the communication module, and the storage unit, for providing a requisite power to the power outlet apparatus; and
    at least one power socket coupled with the protection module;
    wherein the communication module receives the message from the portable device, and causes the message to be stored in the storage unit; and upon a receipt of a first signal asking for an access to the message through the communication module the communication module is caused by the computational processing module to send a second signal including the message to the portable device wirelessly for presenting the second signal including the message on the portable device;
    wherein, the computational processing module is alternatively configured to present the message on a display unit coupled to the computational processing module when detecting a display button associated with the display unit is pressed.

2. The power outlet apparatus as in claim 1, wherein the communication module is a Bluetooth communication module.

3. The power outlet apparatus as in claim 1, wherein the message is a text message, an audio message, or a video message.

4. The power outlet apparatus as in claim 1, wherein the storage unit is a non-volatile memory.

5. The power outlet apparatus as in claim 1, wherein the storage unit is a memory card accessible through a card reader.

6. The power outlet apparatus as in claim 1, wherein the protection module includes a surge protection module.

7. The power outlet apparatus as in claim 1, wherein the protection module includes an electromagnetic interference protection module.

8. The power outlet apparatus as in claim 1, wherein the protection module includes a power converting module, which is for converting an input power.

9. The power outlet apparatus as in claim 1 further comprises:
    an indication unit coupled with the computation processing module, for indicating that the storage unit stores at least one message.

10. The power outlet apparatus as in claim 1, wherein the display unit is a LCD screen.

11. The power outlet apparatus as in claim 1 further comprises:
    a sound generation unit coupled with the computation processing module, for generating sounds.

12. A message leaving method, applicable to a power outlet apparatus with a message leaving module, wherein the message leaving module has a computation processing module, a communication module, and a storage unit, the method comprising:
    receiving a message through the communication module;
    storing the message in the storage unit;
    receiving a command signal as a first signal from a portable device; and
    returning a second signal including the message for presenting the second signal including the message stored in the storage unit on the portable device in response to the command signal; and
    alternatively presenting the message on a display unit of the power outlet after detecting a display button of the display unit of the power outlet has been pressed.

13. The message leaving method as in claim 12, wherein the communication module is a Bluetooth communication module.

14. The message leaving method as in claim 12 further comprises:
  detecting whether the portable device approaches the power outlet apparatus or not before continuously providing the requisite power to the power outlet apparatus.

15. The message leaving method as in claim 12, further comprises:
  sending a power consumption value, a voltage status, and a current status of the power outlet apparatus in form of the second signal to the portable device through the communication module.

* * * * *